C. E. COCHRAN.
CONTROL MECHANISM FOR ELECTRIC VEHICLES.
APPLICATION FILED JULY 28, 1911.

1,020,080.

Patented Mar. 12, 1912.

Witnesses
W. H. Ford
James P. Barry

Inventor
Clyde E. Cochran
By Whittemore Hulbert & Whittemore
Attys

C. E. COCHRAN.
CONTROL MECHANISM FOR ELECTRIC VEHICLES.
APPLICATION FILED JULY 28, 1911.

1,020,080.

Patented Mar. 12, 1912.

3 SHEETS—SHEET 3.

UNITED STATES PATENT OFFICE.

CLYDE E. COCHRAN, OF CLEVELAND, OHIO, ASSIGNOR TO ANDERSON ELECTRIC CAR COMPANY, OF DETROIT, MICHIGAN, A CORPORATION OF MICHIGAN.

CONTROL MECHANISM FOR ELECTRIC VEHICLES.

1,020,080.  Specification of Letters Patent.  Patented Mar. 12, 1912.

Application filed July 28, 1911. Serial No. 640,993.

*To all whom it may concern:*

Be it known that I, CLYDE E. COCHRAN, a citizen of the United States of America, residing at Cleveland, in the county of Cuyahoga and State of Ohio, have invented certain new and useful Improvements in Control Mechanism for Electric Vehicles, of which the following is a specification, reference being had therein to the accompanying drawings.

The invention relates to control mechanism particularly designed for use in connection with electrically propelled vehicles, and the invention consists in various features of construction as hereinafter set forth.

Figure 1:
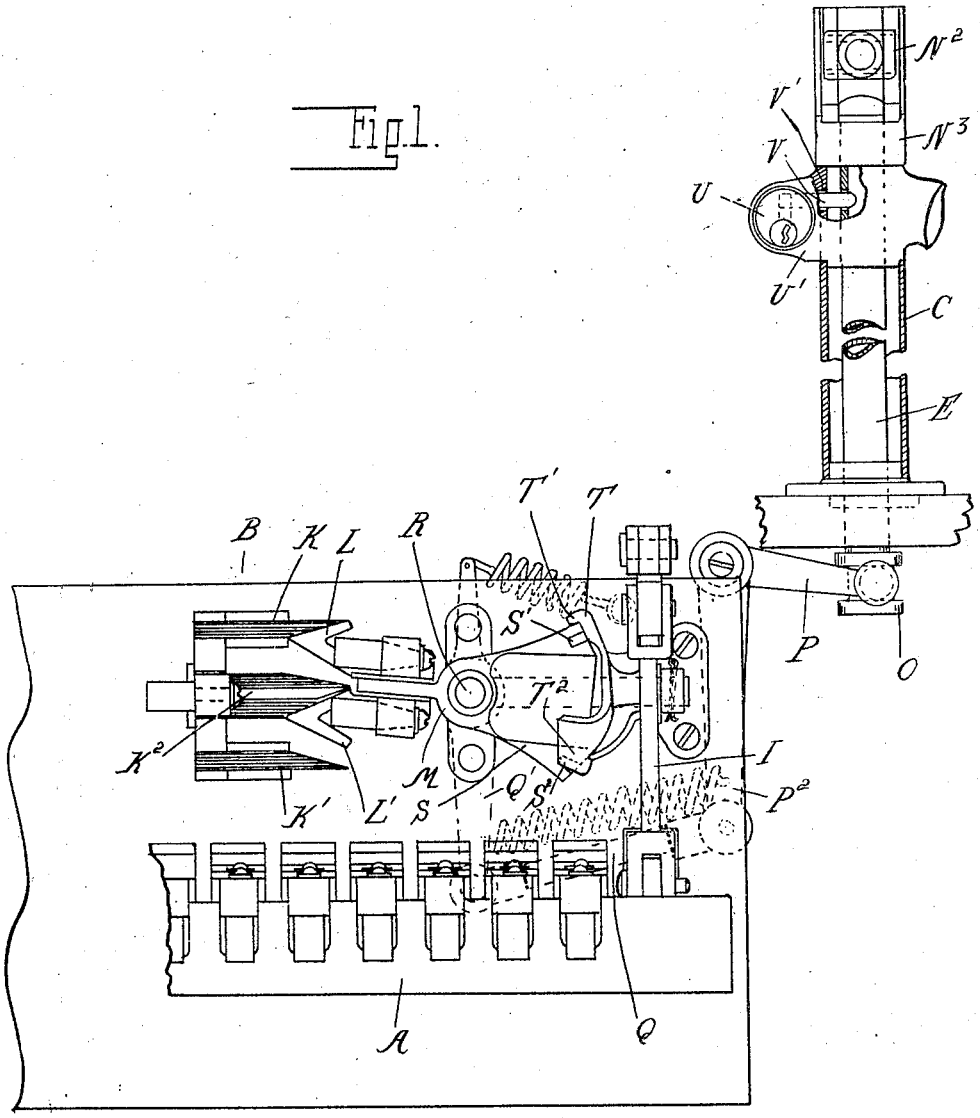
Figure 2:
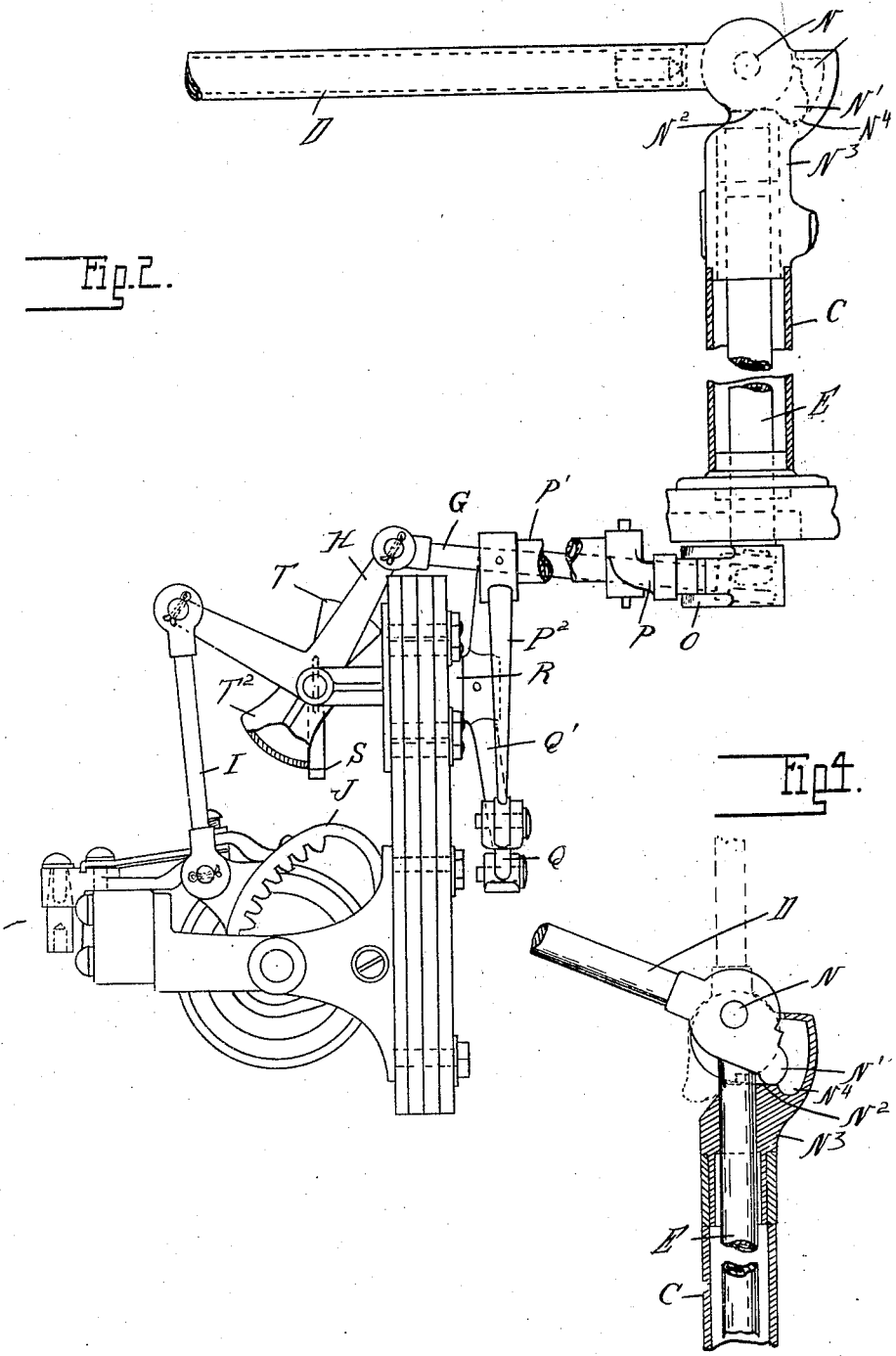
Figure 3:
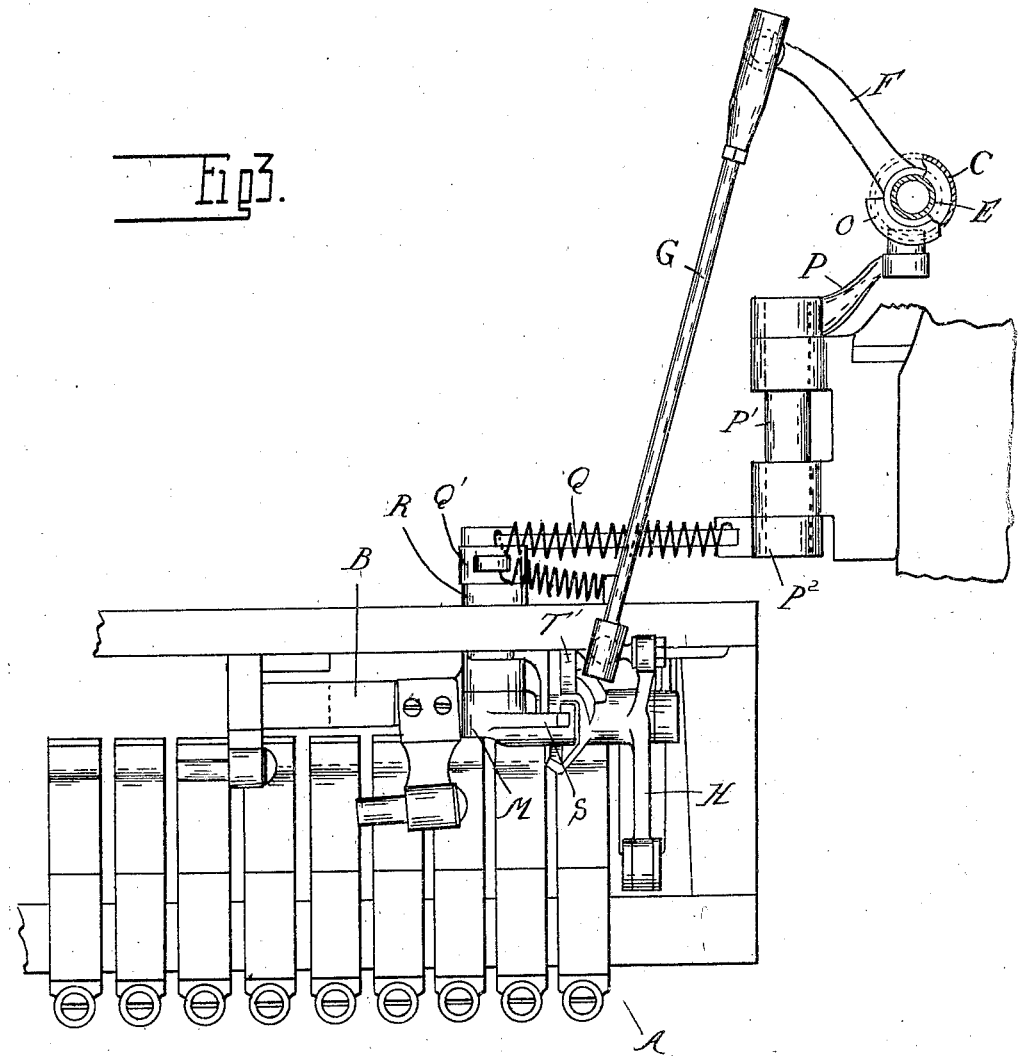

In the drawings,—Figure 1 is a sectional front elevation of the mechanism; Fig. 2 is an elevation at right angles to Fig. 1; Fig. 3 is plan view; and Fig. 4 is a sectional elevation of a portion of Fig. 2.

In the control of electrically propelled vehicles it is necessary to provide first a speed controlling switch by which the electrical connections between the battery and motor are changed in various ways; second, a reversing switch for changing the direction of propulsion; third, a main circuit closing switch by which the vehicle is started or stopped. It is also desirable to effectually prevent unauthorized operation of the machine. All of these results are obtained in my improved construction of control mechanism through the manipulation of a single control lever, the detail construction being as follows:

A diagrammatically represents a speed controlling electric switch which may be of any suitable construction, B is a combined main circuit closing and reversing switch. C is a hollow stem arranged within the vehicle in a convenient location, and D is a control lever at the upper end of said stem for operating mechanical connections passing through the stem and connected to control both the speed controlling and circuit closing reversing switch.

The connection between the lever D and the switch A is formed by the following train of mechanism: E is a stem passing through the hollow stem C and coupled to the lever D so as to be rotated thereby. F is a rock arm connected to the lower end of the stem E which is coupled by the rod G with a bell-crank lever H, and the latter is connected by a rod I with the operating lever J for rotating the switch A. Thus by a movement of the lever D to various positions, the switch A will be rotatively adjusted to a corresponding position, which through the proper arrangement of contacts will change the electric circuits as desired.

As has been stated the lever D controls not only the switch A but also the circuit closing reversing switch B. The latter as preferably constructed comprises a pair of separated contact members K and K' and an intermediate contact member $K^2$, each being preferably formed of a series of thin resilient conducting plates cut off to form a beveled end.

L, L' are coöperating contact members of V-shaped form which are mounted upon but insulated from a rockable lever M. The arrangement is such that in one position of said lever M the contact L is pressed against the beveled end of the contact member K, while the contact member L' is pressed against the contact member $K^2$. In another position of the lever M the contact L is pressed against the contact member $K^2$ and the contact L' against the member K'. The contact members K and K' are connected to be of the same polarity and consequently the two positions of the switch above referred to will reverse the direction of current transmitted therethrough.

The lever M is actuated from the lever D by the movement of the latter in a vertical plane and through the medium of the following mechanism: N is a pivotal connection between the lever D and the stem E which permits rocking the former in a vertical plane. N' is a cam or projecting lug from the lever D which engages a bearing $N^2$ upon the rotatable head $N^3$ secured to the upper end of the stem E. In the horizontal position of the lever D the lug N' engages a recess $N^4$ in the bearing $N^2$, but upon raising the lever through a limited angle, as for instance 20°, the bearing $N^2$ will form a fulcrum for the lug N', causing the upward movement of the pivot N and the stem E secured thereto. This in turn will raise a segmentally slotted member O at the lower end of the stem E which is in engagement with a rock arm P on the rock shaft P'. At the opposite end of this rock shaft is a rock arm $P^2$ connected by a link Q with a rock arm Q' on a rock shaft R, and upon which shaft the lever M of the switch B is mounted. Thus the raising of the lever D will cause a rocking of the lever M which will shift the contacts L and L' to reverse the circuit. This adjustment of the lever D to the angular position does not prevent said lever from being moved in a direction to rotate the stem E as the engagement of the arm P with the segmentally slotted member O will permit the free rotary movement of the stem E and rock arm F. Consequently the lever D in its new position of vertical adjustment is capable of being moved into all the positions of lateral adjustment necessary to operate the circuit controlling switch A. The effect is that whether the motor is driving the vehicle forward or rearward the speed may be controlled with equal facility.

The circuit controlling switch A is preferably of the snap type, causing a quick movement in opening or changing the circuits, which will avoid injury from arcing. On the other hand the switch B is moved slowly and the opening of a circuit thereby would be objectionable. I have therefore provided a locking means which prevents the possibility of operating the switch B when the circuit is closed by the switch A, or the operation of the switch A when the switch B is open. This locking mechanism as shown is formed by providing the lever M with a notched segment S and mounting upon the bell-crank H, a guard member T having an interlocking engagement with the notched segment. The member T has two segmental flanges T' and T² which may be alternatively engaged with notches S' and S², the one engagement holding the switch B in a position to drive the vehicle ahead, and the other locking said switch in the reversed position. In either position the switch A may be operated to all of its various positions of adjustment, but only in the position of said switch A where the circuit is open will the segments T' and T² be completely disengaged from the notches S' and S² so as to permit adjustment of the lever M. The movement of the switch A during adjustment of the lever M is prevented by the flange S which stands in the path of the segments T excepting in the open position of the switch A.

To prevent the unauthorized manipulation of the control mechanism, a locking mechanism is provided which is preferably applied to the stem C. This as shown consists of a key actuated lock mechanism U mounted in a laterally extending bearing U' upon the upper end of the stem C, said locking mechanism being adapted to throw a locking bolt V engaging a recess in the rotatable stem E. The bolt and its actuating mechanism is completely housed within the casing U' and can only be manipulated by the proper key, and furthermore, the location of the recess V' for the bolt V is such as to only register with said bolt when the lever D is in a position to open the electric circuit. The position preferably selected for this purpose is that in which the lever D is raised to a vertical position in alinement with the stem C. Thus it is not only impossible for an unauthorized person to manipulate the control mechanism when locked but it is equally impossible for the mechanism to be locked when the motor is in circuit.

What I claim as my invention is:

1. In a control mechanism for electric motors, the combination with a circuit closing and speed controlling switch and a reversing switch, of an actuating device comprising a hollow stem and a rotatable stem positioned therein, connection between said rotatable stem and said circuit closing and reversing switch for progressively actuating the latter, a lever for rotating said stem pivotally attached thereto for movement in the longitudinal plane of the stem so as to be adjustable to different inclinations, a fulcrum bearing for said lever on said hollow stem whereby the vertical adjustment of the lever will cause a longitudinal adjustment of said rotatable stem, and connections operated by the longitudinal adjustment of said stem for operating said reversing switch.

2. In a control mechanism for electric motors, the combination with a circuit closing and speed controlling switch, and a reversing switch, of means for alternatively actuating said switches comprising a rotatable and longitudinally adjustable stem, a lever for actuating said stem in each of its directions of adjustment, two intermediate trains of mechanism between said stem and said switches and respectively operated by the longitudinal and the rotary adjustment of the stem, and interlocking means for preventing the adjustment of either of said switches when the other switch is not in proper relative position.

3. In a control mechanism for electric motors, the combination with a circuit closing and speed controlling switch and a reversing switch, of an operating device therefor comprising a rotatable stem, connections between said stem and said circuit closing and speed controlling switch for progressively operating the latter by the rotation of the same, a lever for rotating said stem adjustable into different planes of movement, and connections actuated by said latter adjustment for operating said reversing switch.

4. In a control mechanism for electric motors, the combination with a circuit closing and speed controlling switch and a reversing switch, of an actuating device comprising a rotatable stem, connections between said stem and said circuit closing and reversing switch for progressively actuating the latter, a lever for rotating said stem pivotally attached thereto for movement in the longitudinal plane of the stem so as to be adjustable to different inclinations, a fulcrum bearing for said lever whereby its vertical adjustment will cause a longitudinal adjustment of said stem, and connections operated by the vertical adjustment of said stem for operating said reversing switch.

5. In a control mechanism for electric motors, the combination with a circuit closing and speed controlling switch and a reversing switch, of a common actuating device therefor comprising a rotatable and longitudinal adjustment stem, a lever connected to said stem adjustable to different inclinations to avoid the vertical movement of the stem, connections between said stem and said circuit closing and speed controlling switch and said reversing switch whereby they are respectively adjusted by the rotary and vertical adjustment of said stem, and locking means for preventing the rotary adjustment of the stem during the vertical adjustment thereof, and the vertical adjustment during the rotary movement thereof.

6. In a control mechanism for electric motors, the combination with a circuit closing and speed controlling switch and a reversing switch, of a common actuating device therefor comprising a rotatable and longitudinally adjustable stem, a lever for actuating said stem in each of its adjustments, connections between said stem and the respective switches by which the rotation of the stem will adjust one switch and the longitudinal movement of the stem will adjust the other switch, and transversely movable members connected to their respective transmission connections having an interlocking engagement with each other whereby the movement of one is prevented during the movement of the other.

7. In a control mechanism for electric motors, the combination with a switch, of an actuating device comprising a rotary and longitudinally adjustable stem, a stationary bearing for said stem, a key controlled locking bolt housed within said stationary bearing, and a keeper for said bolt in said adjustable stem.

8. In a control mechanism for electric motors, the combination with a circuit closing and speed controlling switch, and a reversing switch, of a single actuating device adjustable in transverse planes for alternatively operating said switches, and means for preventing the actuation of either switch by said actuating means when the other switch is not in a proper relative position of adjustment.

9. In a control mechanism for electric motors, the combination with a plurality of switches, of means for alternately actuating said switches comprising a rotatable and longitudinally adjustable member, and a connection between said member and said switches for actuating one of said switches upon the rotary adjustment of said member, and the other of said switches upon the longitudinal adjustment of said member.

10. In a control mechanism for electric motors, the combination with a current closing and speed controlling switch, and a reversing switch, of a member rotatable for actuating said speed controlling switch and longitudinally adjustable for actuating said reversing switch, said member being rotatably adjustable in a plurality of positions of longitudinal adjustment.

11. In a control mechanism for electric motors, the combination with a circuit closing and speed controlling switch and a reversing switch, of an operating device therefor comprising a rotatable stem, connections between said stem and said circuit closing and speed controlling switch for progressively operating the latter by the rotation of the same, a lever for rotating said stem adjustable into different planes of movement, and connections actuated by said latter adjustment for operating said reversing switch, said lever being rotatable in the different planes to which it is adjusted for operating said reversing switch.

12. In a control mechanism for electric motors, the combination with a plurality of switches, of a common actuating device therefor comprising a vertical member operatively connected thereto, a lever for rotating said member to operate one of said switches, said lever being angularly adjustable into different planes for actuating another of said switches, permitting of the rotary adjustment of said member in a plurality of positions of angular adjustment.

In testimony whereof I affix my signature in presence of two witnesses.

CLYDE E. COCHRAN.

Witnesses:
GEO. W. SPOONER,
INA M. HARRIVEL.